United States Patent [19]
Nakai

[11] Patent Number: 5,307,488
[45] Date of Patent: Apr. 26, 1994

[54] SYSTEM INTERRUPTION APPARATUS
[75] Inventor: Toshio Nakai, Tokyo, Japan
[73] Assignee: Nippon Steel Corporation, Tokyo, Japan
[21] Appl. No.: 851,846
[22] Filed: Mar. 13, 1992
[30] Foreign Application Priority Data
  Mar. 15, 1991 [JP]  Japan .................................. 3-76746
[51] Int. Cl.⁵ .............................................. B06F 9/46
[52] U.S. Cl. .............................. 395/650; 364/DIG. 1; 364/241.3; 364/242; 364/280.8
[58] Field of Search .................. 364/DIG. 1, DIG. 2; 395/650, 725
[56] References Cited

U.S. PATENT DOCUMENTS 4,004,283  1/1977  Bennett et al. ............... 364/DIG. 1
4,519,516  6/1979  Henrion et al. .............. 364/DIG. 1
4,851,987  7/1989  Day .............................. 364/DIG. 1

OTHER PUBLICATIONS

IBM Technical Disclosure Bulletin vol. 27, No. 1B, Jun., 1984, pp. 554-556, "Interrupt Request Circuit", Russell et al.
European Search Report EP 92 10 4384.

Primary Examiner—Thomas M. Heckler
Attorney, Agent, or Firm—Kenyon & Kenyon

[57] ABSTRACT

A system interruption apparatus alternately sends interruption signals INT1 and INT2 at first time intervals to a central processing unit executing an operation if interruption does not occur within a second time interval to thereby cause an interruption and suspend the operation of the central processing unit.

10 Claims, 7 Drawing Sheets

| COMMAND A | 0 |
| COMMAND B | 1 |
| COMMAND C | 1 |
| COMMAND D | 0 |
| | |
| COMMAND N | 1 |

Fig. 6

SYSTEM INTERRUPTION APPARATUS

BACKGROUND OF THE INVENTION

1. Field of the Invention

The present invention relates to a system interruption apparatus for sending an interruption signal to a main processor to suspend the execution of an operation.

2. Description of the Related Art

In personal computers, etc., an interruption signal is sent to a main central processing unit (referred hereinafter as CPU) when system interruption is required. The system is constructed so that the interruption signal is generated, for example, when a user makes use of a resume function provided for the system.

When receiving said interruption signal, execution of an operation is suspended until a release signal is received, and upon receiving the release signal, the execution of the operation resumes.

In a conventional system, however, there is a problem that the desired interruption does not occur while the main CPU is disabled for the interruption signal. This state occurs, for example, when the executed application program has masked that interruption signal. During this state, the resume function cannot be used even though the user attempts to use the function.

SUMMARY OF THE INVENTION

Therefore, it is an object of the present invention to provide a system interruption apparatus that can surely interrupt a main CPU executing a software program.

In accordance with the present invention, there is provided an apparatus for sending interruption signals to a central processing unit executing a software program, comprising a means for sending a first interruption signal to the central processing unit, a means for detecting the occurrence of an interruption in response to interruption signals sent from the apparatus, and a means for sending a second interruption signal to the central processing unit following the first interruption signal at a first time interval if the detecting means does not detect the occurrence of an interruption in response to the first interruption signal.

DETAILED DESCRIPTION

Figure 1:
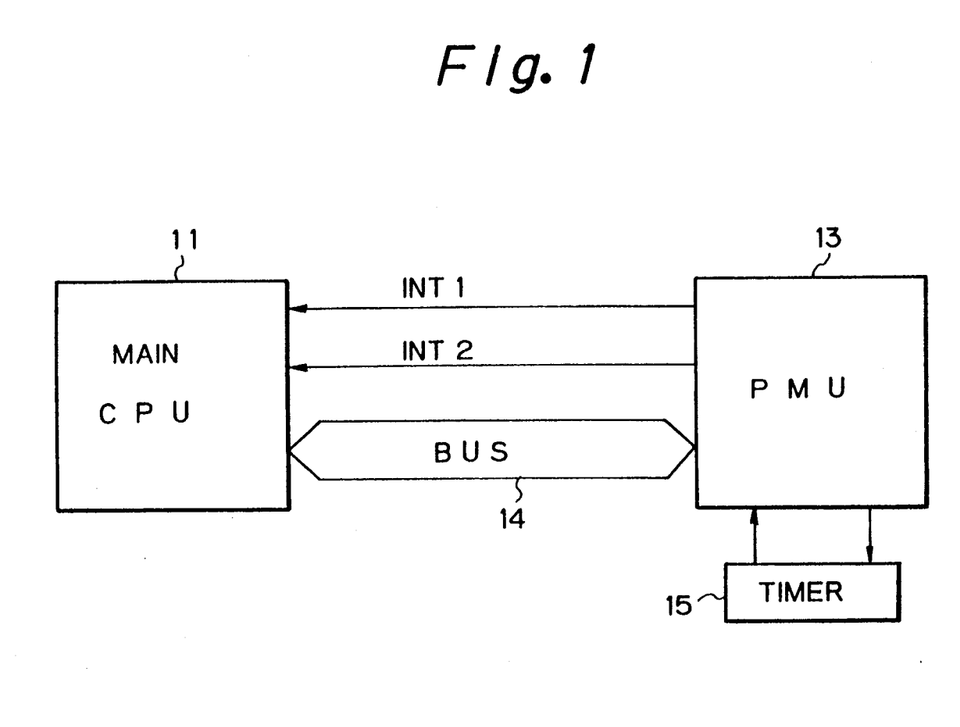
FIG. 1 is a block diagram showing the construction of a computer system according to the present invention.

FIG. 1 is a block diagram of a computer system according to an embodiment of the present invention. The present invention may be applied to various types of computers such as notebook type, lap-top type, desk-top type and others.

In FIG. 1, a Power Management CPU (reference hereinafter as PMU) 13 is connected to a main CPU 11 executing an application program. The PMU 13 is provided generally for controlling a power source for each section of the computer system. A timer 15 is provided for the PMU 13.

In this construction, suppose that an interruption signal INT1 is sent from the PMU 13 to the CPU 11 that is executing an application program to temporarily preserve data necessary for suspending the execution of the program and for resuming the execution from the same state.

At this time, if the main CPU 11 is disabled for that interruption signal, namely, if the interruption signal INT1 is masked by the application program, the desired interruption does not occur. When the interruption does not occur, the PMU 13 can recognize that the desired interruption does not occur, from the fact that the main CPU 11 does not read out the contents of a register in the PMU 13 through a data bus 14.

Figure 2:
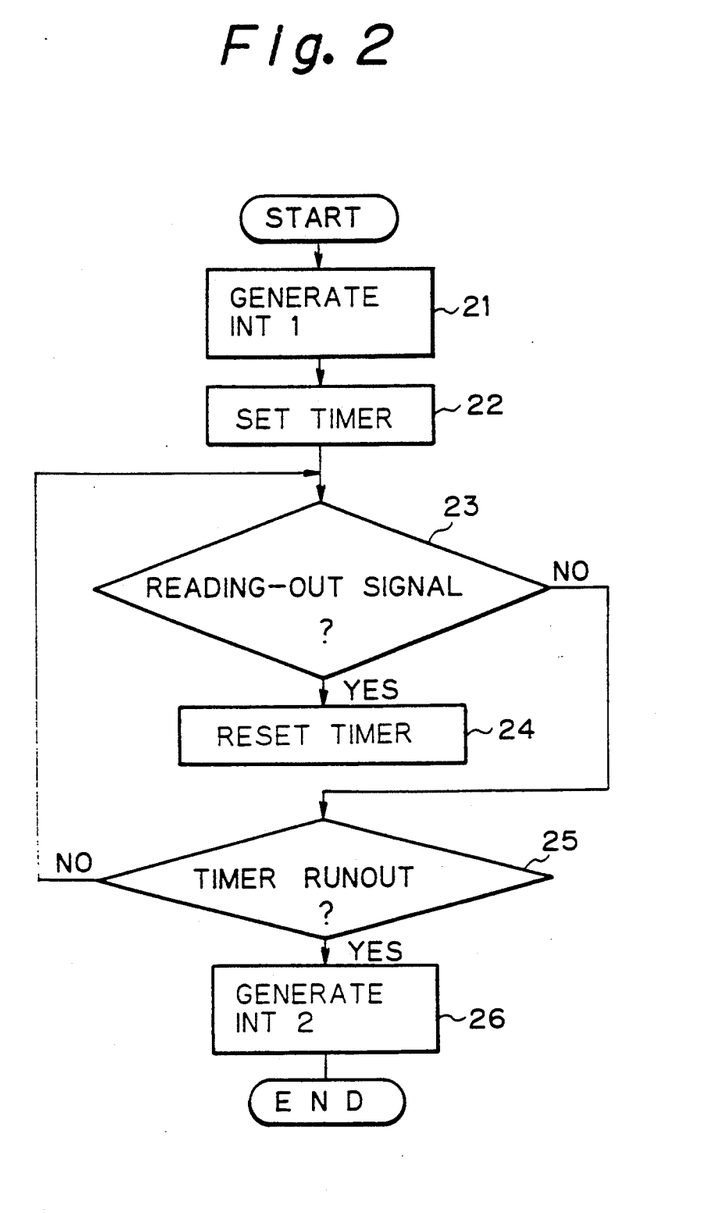
FIG. 2 is a flow chart showing a first embodiment of the present invention.

FIG. 2 is a flow chart showing an operation flow of the PMU 13 to perform the above decision.

In step 21, the PMU 21 generates an interruption signal INT1, sends the signal to the main CPU 11, and in step 22, sets the timer 15 so as to start counting time. In step 23, if the PMU 13 receives a signal for reading-out the contents of the register from the main CPU 11 before the timer 15 counts a predetermined time, in step 24, the timer 15 is reset and stops counting. If the signal is not received, and in step 25, if timer runout occurs in the timer 15, the PMU 13 generates an interruption signal INT2 to the main CPU 11 in step 26.

In the above operation flow of the PMU 13, although interruption does not occur by the interruption signal INT1, the interruption occurs by the second interruption signal INT2 generated after predetermined time has passed.

Next, an operation flow that can deal with the case where the application program has also masked the interruption signal INT2, is described with reference to FIGS. 3A and 3B.

The construction of the hardware is the same as that of FIG. 1 except that the timer 15 includes a first timer-1 and a second timer-2. When a user of the computer operates the system to use the resume function, in step 31, the PMU 13 sets timer-1, in step 32, generates the interruption signal INT1 and in step 33 sets timer-2. Time intervals for timer-1 and timer-2 are automatically or manually set at appropriate times in advance so that the time interval set in timer-1 is longer than that of timer-2.

In step 34, it is determined whether the CPU 11 has executed the reading-out operation of the register in the PMU 13 by examining whether the signal therefor has been received. If the signal is not received, timer-1 is examined in step 35. If timer-1 does not run out, timer-2 is examined in step 36. If timer-2 does not run out in step-36, the execution flow is returned to step 34.

In step 34, if the signal for reading-out the contents of the register has been received, it indicates that the interruption has occurred within the predetermined time interval, then timer-1 and timer-2 are reset in step 37 and the process is completed.

In step 35, if the timer-1 runs out, this indicates that the interruption has not occurred within the predetermined time interval. A message "FAILED TO SUSPEND" is displayed and the process is completed. The user knows from this message that the execution of the resume function has failed.

In the conventional system, if the resume function is effected, the user knows the same by noticing that there arises a change in the display screen, but if the resume function is not effected, the user cannot obtain a positive indication. In contrast to this, a positive message is obtained when the resume function is not effected in the system of FIGS. 3A and 3B.

In step 36, if timer-2 runs out, an interruption signal INT2 is generated in step 39 and timer-2 is reset in step 40. After that, it is determined whether the register reading-out signal is received in step 41. If the signal is not received, it is determined whether timer-1 runs out in step 42. If timer-1 does not run out, it is determined whether timer-2 runs out in step 43. If timer-2 does not run out, the execution flow returns to step 41.

In step 41, if the register reading-out signal has been received, namely, if the interruption caused by the interruption signal INT1 does not occur, but the interruption caused by the interruption signal INT2 occurs, then timer-1 and timer-2 are reset in step 44, and the process is completed.

In step 42, if timer-1 runs out, it indicates that interruption did not occur though at least two interruption signals INT1 and INT2 requested the interruption within that time interval, then a message "FAILED TO SUSPEND" is displayed to inform the user of failure of the interruption in step 45, and the process is completed similar to step 38.

In step 43, if timer-2 runs out, the interruption signal INT1 is again generated in step 46 and the execution flow returns to step 33, because the time set in timer-1 has not yet expired.

In the aforementioned process, even when the interruption does not occur by the second interruption signal INT2, the suspend operation is retried within the time interval of timer-1 by generating the interruption signals INT1 and INT2 many times. Therefore, the inconvenience of performing repeated operations is reduced.

In addition, when the interruption signals INT1 and INT2 are both temporarily masked by the application program, the interruption occurs as soon as the application program releases the masking.

Figure 3A:
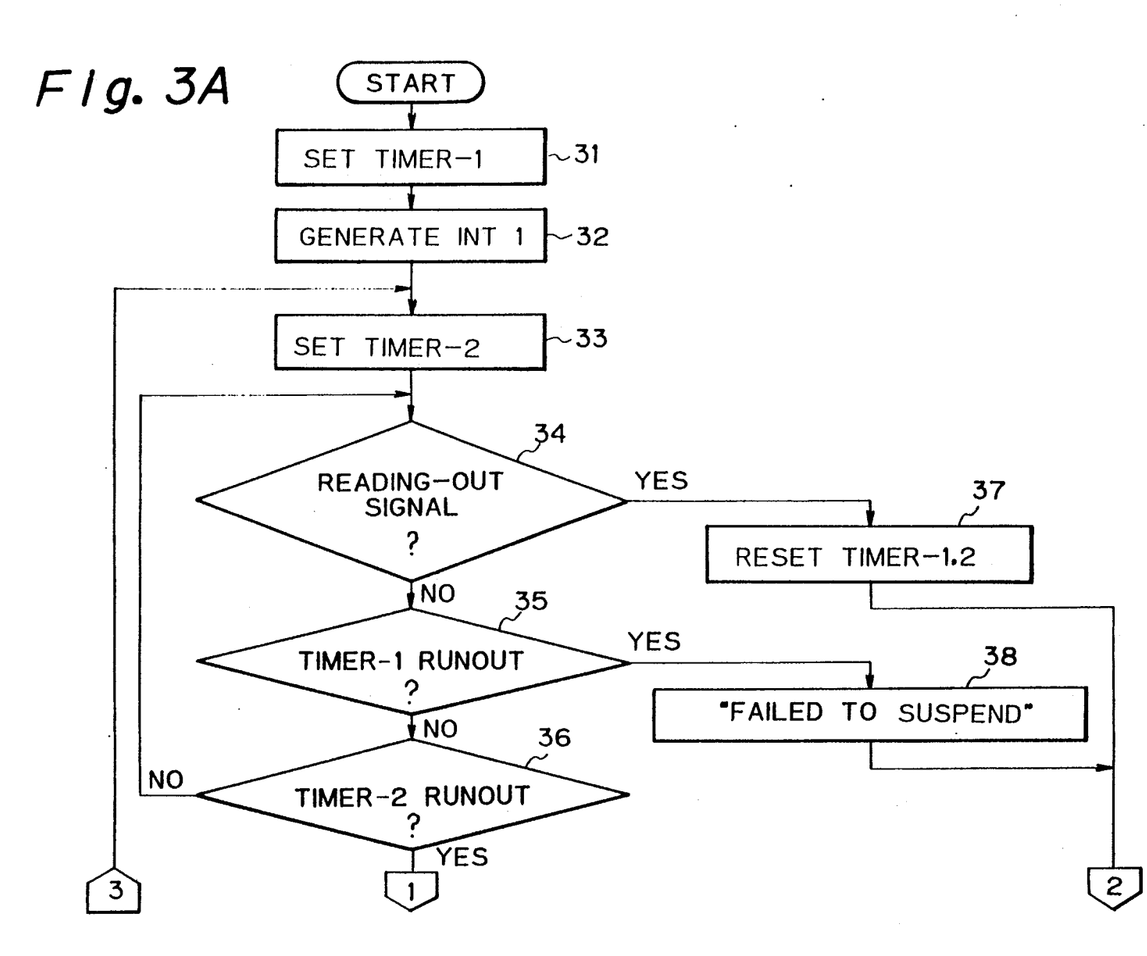
FIGS. 3A and 3B represent a flow chart showing a second embodiment of the present invention.
Figure 3B:
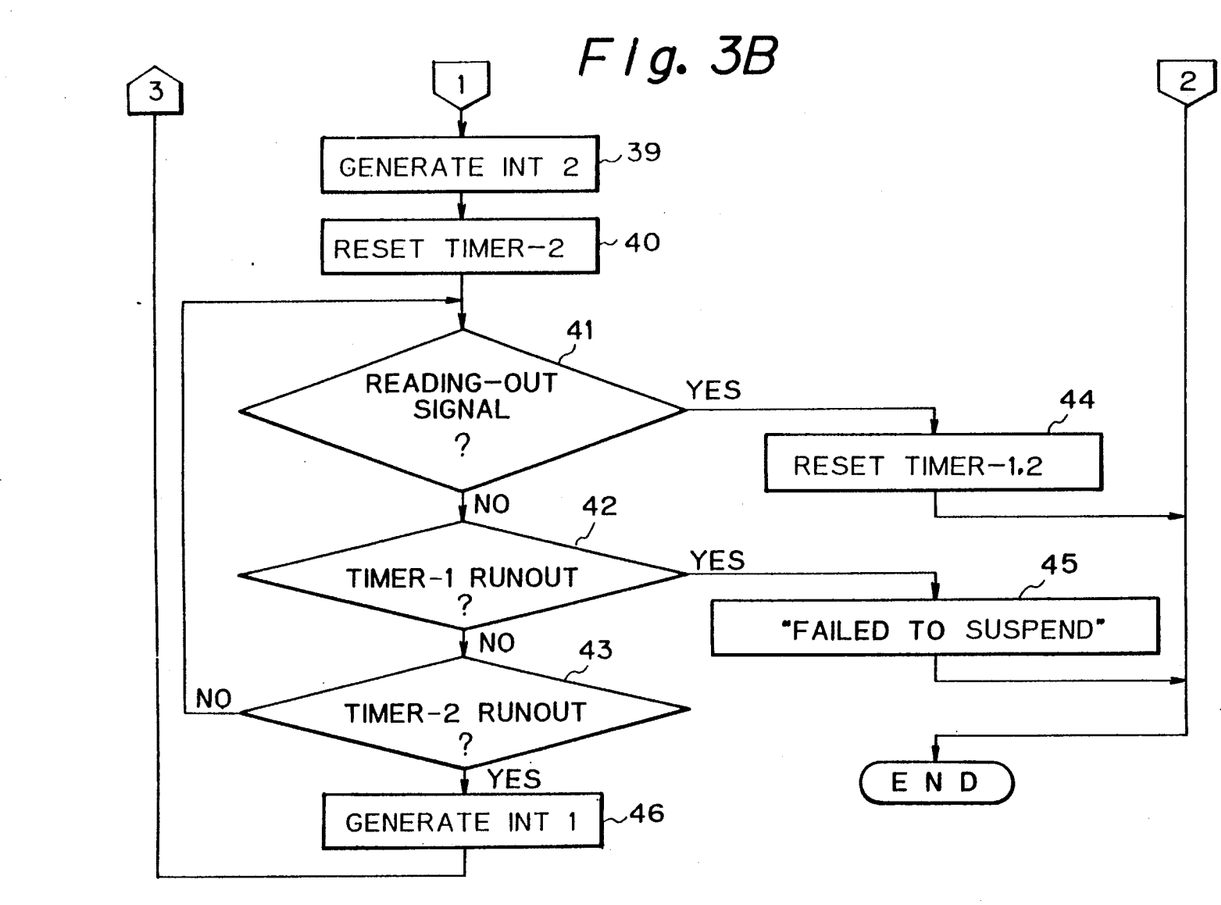
Figure 4A:
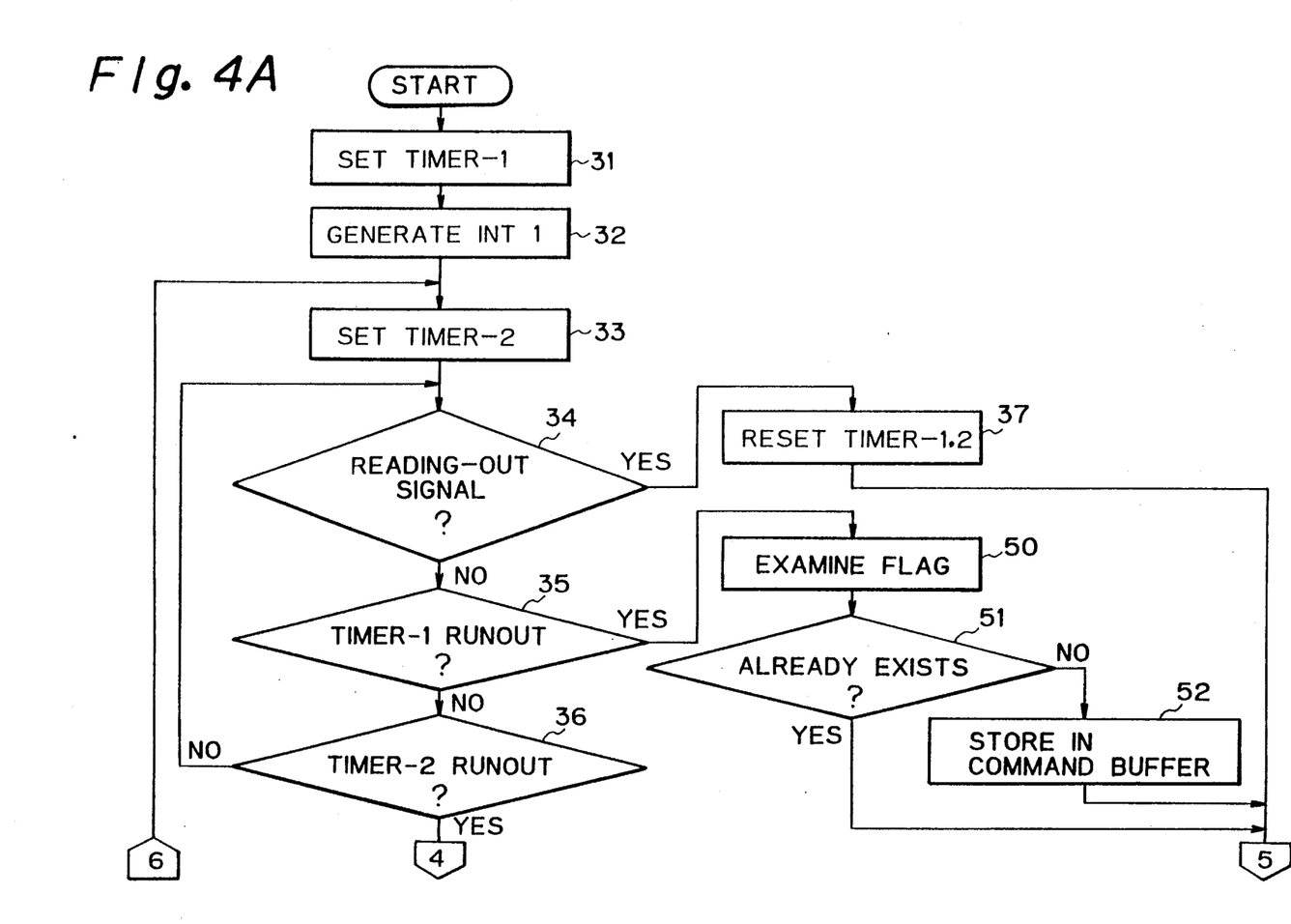
FIGS. 4A and 4B represent a flow chart showing a third embodiment of the present invention.
Figure 4B:
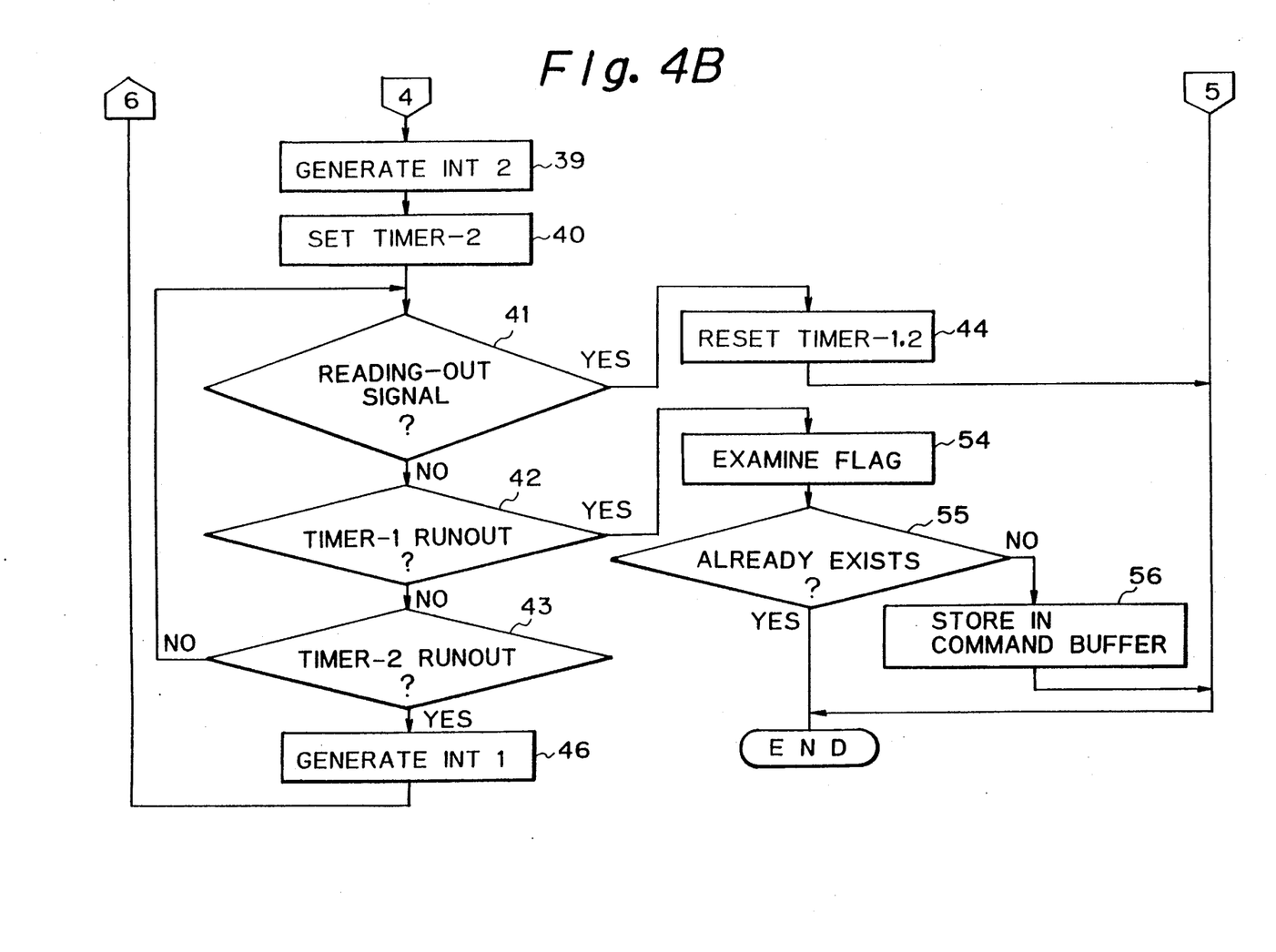

FIGS. 4A and 4B represent a flow chart showing another embodiment of the present invention. In the embodiment of FIGS. 3A and 3B, the message "FAILED TO SUSPEND" is displayed for the user when timer-1 runs out. However, since the message contaminates a display screen, an additional operation to recover the display screen is required. In the embodiment described hereinafter with reference to FIGS. 4A and 4B, a command buffer process is executed instead of displaying the message.

In FIGS. 4A and 4B, the same reference numerals as used in FIGS. 3A and 3B are used for steps that are similar to those in FIGS. 3A and 3B, and thus descriptions thereof are left out.

The difference exists in the process when timer-1 runs out in the step 35 or 42. When timer-1 runs out, the suspend command issued by the user remains as an unexecuted command. In step 50, flags stored for individual commands in a command table are examined to decide whether the same unexecuted command already exists in a command buffer. In step 51, if the same unexecuted command does not exist in the command buffer, the unexecuted command is stored in the command buffer in step 52, and if the same unexecuted command already exists in the command buffer, the unexecuted command is not stored in the command buffer. The commands stored in the command buffer are retried within an appropriate time.

Figure 5:
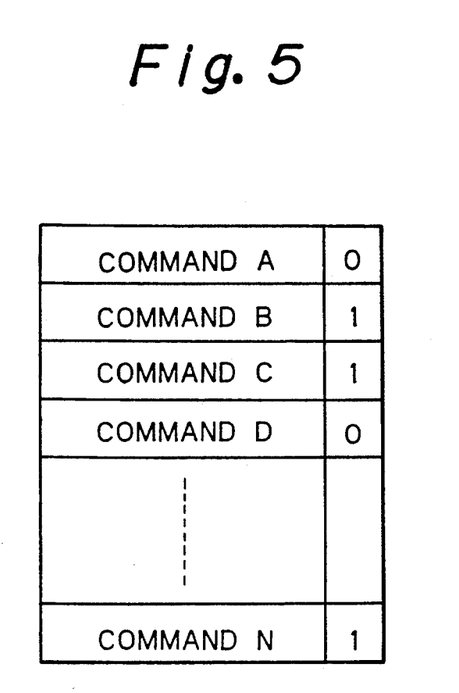
FIG. 5 is a diagram showing the construction of a command table.
Figure 6:
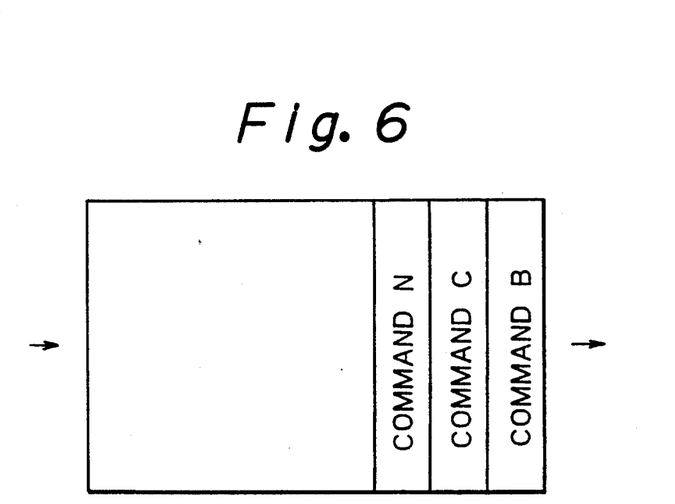
FIG. 6 is a diagram showing the construction of a command buffer.

FIG. 5 and FIG. 6 show a construction of the command table and the command buffer, respectively. The command buffer shown in FIG. 6 consists of a FIFO (first-in first-out) memory. When command B, C and N exist in the command buffer as shown in FIG. 6, flags corresponding to the commands B, C and N are logic "1" and flags corresponding to the other commands are logic "0" as shown in FIG. 5. Supposing that the suspend command is the command C, in step 50, the flag corresponding to the command C is examined. If that flag is logic "1" as shown in FIG. 5, the command C is not stored in the command buffer, and if the flag is logic "0", the command C is stored in the command buffer. When the command is executed within the appropriate time as mentioned above, the command is erased in the command buffer and the corresponding flag is set to logic "0".

The process in steps 54, 55 and 56 are similar to those in steps 50, 51 and 52, and thus the description thereof is omitted.

As mentioned above, in the present embodiment, since the function that has not been effected is effected through the command buffer process, the user needs not retry the function. In addition, since a command is stored in the command buffer only when the same command is not stored, an overflow does not occur in the command buffer.

Although the aforementioned embodiments are described in the case of the two interruption signals INT1 and INT2, the number of interruption signals may be three or more.

What is claimed is:

1. An apparatus for sending interruption signals to a central processing unit executing a software program, the central processing unit outputting a response signal indicative of executing an interrupt routine in response to the interruption, comprising:

means for sending a first interruption signal to the central processing unit;

first means for detecting a response signal in response to the first interruption signal, within a first time interval and means, operatively connected to the first means for detecting, for sending a second interruption signal to the central processing unit if the first detecting means does not detect the response signal within the first time interval.

2. The apparatus of claim 1, further comprising:

second means for detecting the response signal which is output in response to the second interruption signal, within a second time interval; and means, operatively connected to the first and the second detecting means, for alternately activating the first interruption signal sending means and the second interruption signal sending means within a third time interval longer than the first and the second time intervals until one of the first and the second detecting means detects the response signal.

3. The apparatus of claim 2, further comprising:

a command buffer for storing commands which are not executed by the central processing unit, the unexecuted commands including a command causing the interruption signals, and means for storing the command causing the interruption signals when the first and the second detecting means do not detect the response signal within the third time interval.

4. The apparatus of claim 3, further comprising:
a command table for storing flags indicating whether respective commands are stored in the command buffer, and
means for examining the flags stored in the command table to thereby decide whether commands corresponding to the flags are stored in the command buffer, wherein the storing means stores the command causing the interruption signals when the examining means decides that the command causing the interruption signals is not stored in the command buffer.

5. The apparatus of claim 4; wherein the command buffer includes a first-in first-out memory.

6. The apparatus of claim 2, further comprising means, operatively connected to the first detecting means, for measuring the first and the second time intervals.

7. The apparatus of claim 2, further comprising means, operatively connected to the first and the second detecting means, for displaying a message indicating that the interruption signals have not been accepted when the first and the second detecting means do not detect the response signal within the third time interval.

8. The apparatus of claim 1, further comprising means, operatively connected to the first detecting means, for measuring the first time interval.

9. The apparatus of claim 1; wherein the response signal is a signal for reading-out the contents of a register in the apparatus.

10. The apparatus of claim 1; wherein the interruption signal is sent to the central processing unit to suspend the execution of the software program until a release command is sent to the central processing unit.

* * * * *